3,373,007
METHOD AND MEANS FOR CONTROLLING INTERNAL FURNACE PRESSURES
Winton A. Ticknor, Lancaster, Ohio, assignor to Owens-Corning Fiberglas Corporation, a corporation of Delaware
Filed Nov. 12, 1965, Ser. No. 507,442
8 Claims. (Cl. 65—161)

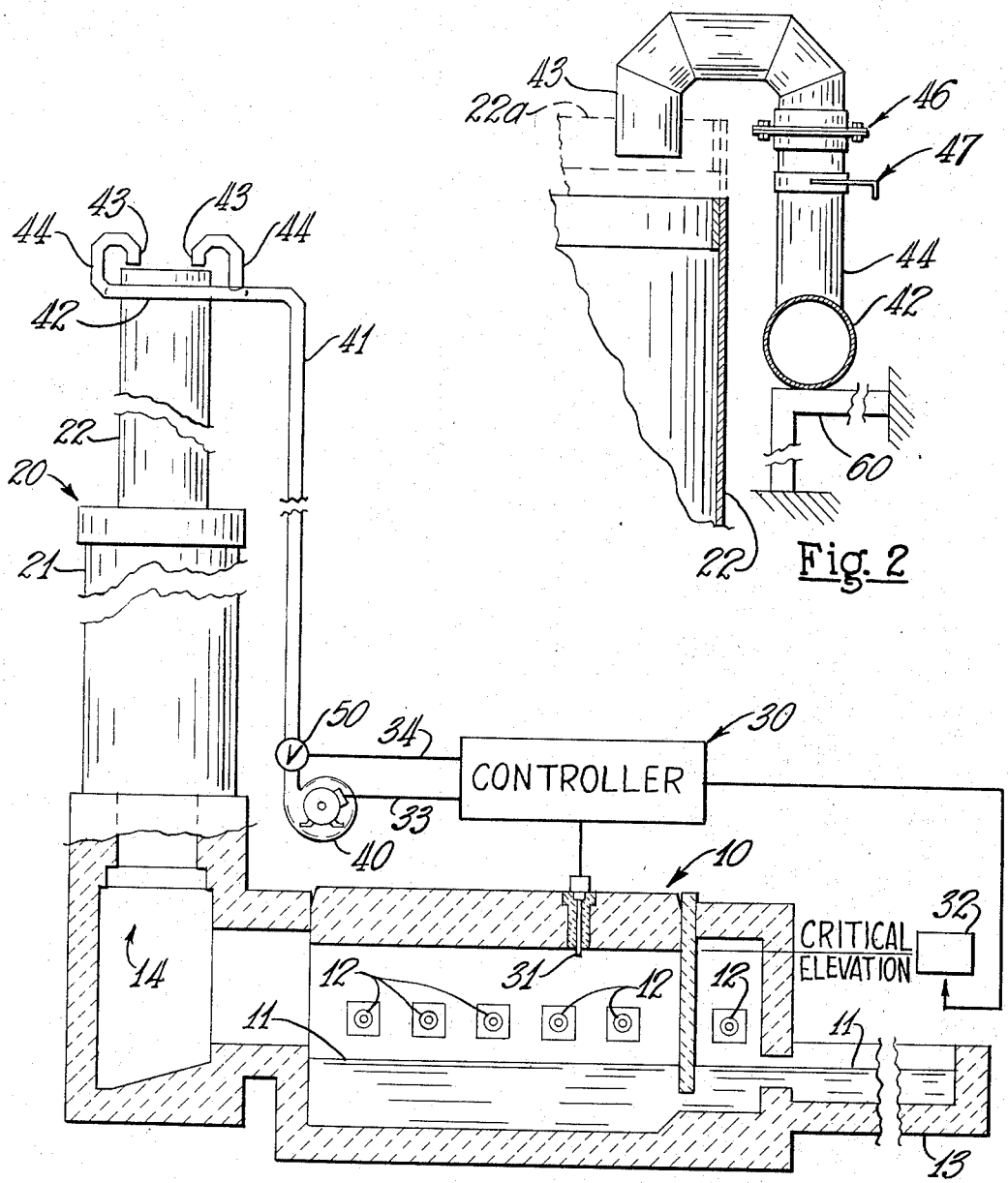

ABSTRACT OF THE DISCLOSURE

Apparatus for controlling the level of a pool of molten glass in a feeder-forehearth supplying glass for attenuation into fibers and thus controlling the diameter of the fibers attenuated wherein the feeder-forehearth is connected to receive a pool of glass from a melting tank of a direct-melt furnace. The pressure in the melting tank of the furnace is detected. The volume of a vertical air curtain directed downwardly into the furnace stack is controlled in response to the pressure detected and thus controls the level of the pool of glass in the melting tank and in the forehearth-feeder.

---

This invention relates to the control of internal furnace pressures generally and more particularly to the control of pressures within a direct-melt furnace for molten glass, which furnace has a stack adapted to draw combustion products from within the furnace.

It has been a practice to melt glass batch or cullet in a furnace and flow the molten material into a forehearth in order to supply glass in a flowable condition to one or more feeders associated with the forehearth. The feeders are formed with a plurality of small openings or orifices through which streams of glass flow from the forehearth, providing glass bodies which may be readily attenuated into fibers. The streams or glass bodies may be attenuated into fibers by various means such as by engaging hot gaseous blasts moving at high velocities with primary filaments formed from the streams or engaging the streams directly with blasts of steam or compressed air. If continuous filaments or fibers are desired, the streams may be attenuated by directing the filaments into contact with rapidly rotating pull or nip rolls or the filaments or stand of filaments may be rapidly wound upon a cylindrical sleeve or mandrel into package form, the winding of the strand at high speed providing the force for attenuating or drawing the streams into filaments.

The uniformity and quality of fibers of filaments attenuated form the glass streams or primary filaments formed therefrom are, in a large measure, dependent upon the homogenous character of the glass composition wherein the constituents are uniformly distributed and upon the proper control of temperature and viscosity characteristics of the glass adjacent each feeder associated with the forehearth. The evolution of methods and means for drawing glass fibers of extremely small diameter has caused great care to be taken with the above items since the diameter of the fibers is dependent upon the foregoing characteristics.

The diameter and uniformity of the fibers is also dependent upon the "head" or glass level in the feeders and thus upon the level of the glass in the furnace supplying the forehearths and feeders. A variation in the head or level of glass causes a greater or lower pressure upon the glass bodies being attenuated and thus affects the diameter thereof. There have been developed a number of glass level controls which may vary the level by changing the rate of feeding of solid glass into the furnace for melting. However, the glass level control cannot of and in itself maintain a fine control of the glass level since the pressure within the interior of the furnace may vary from that exterior of the furnace to which the molten glass is being fed, thus cause a raising or lowering of the glass level and rippling in the forehearths being fed. For example, an increase in the pressure within the furnace with respect to the pressure exterior to the furnace pushes the glass level down in the furnace and raises the level of molten glass in the forehearths and feeders. Conversely, a lowering of the pressure within the furnace may cause the glass level to rise within the furnace and the lowering of the glass level in the associated forehearths and feeders.

In the prior art various methods have been utilized to attempt to control the pressure within the furnace. For example, air cones have been placed on the top of stacks, each cone having removable sections to increase the diameter of the stack opening to provide a greater draft. However, the air cone methods have presented problems with condensation of the material rising through the stack, with the condensation gathering and hardening on the air cone or dropping back down the stack. Tangential air blasts from tangentially located nozzles in the stack have been utilized to dampen or slow the progress of combustion products up the stack and thus control the pressure within the furnace. However, the tangential nozzles, where they are used in combination with the air cone method above or in combination with a venturi-type stack have had problems in that the tangentially disposed air nozzles clogged with slag. Further, the control range of the tangential nozzles is relatively small. Mechanical systems have been utilized in which a plug or cone-shaped damper has been lowered into and raised out of the stack opening at the top to change the pressure within the furnace. These are expensive since the alloy of the mechanical damper must be able to withstand the high temperatures. Further, the linkages of such mechanical systems collect condensed slag and dirt and need cleaning frequently, sometimes as often as once a week. Therefore, plugging, small control range and other problems have been connected with the previous methods so that interruptions ensue from their use and labor costs have been high in the maintenance and replacement of the apparatus for accomplishing the previous methods.

Accordingly, it is an object of this invention to provide a new and improved means for controlling the internal pressure of a furnace.

It is a further object of this invention to provide a method and apparatus for controlling the pressure at the level of a pool of molten glass in a direct-melt furnace having a stack adapted to draw combustion products from the furnace.

The invention features a method for controlling the pressure as discussed hereinbefore comprising the steps of detecting the pressure within the furnace, directing an air curtain downwardly into the stack, and regulating the volume of the air in the air curtain in response to the detection of predetermined pressures within the furnace.

Apparatus for carrying out the above method comprises means for detecting the pressure within the furnace, means for directing an air curtain substantially vertically downwardly into the stack, means for supplying air to the air directing means, and means responsive to the pressure detecting means for controlling the volume of air supplied to the directing means. The directing means may comprise a plurality of air nozzles in the preferred embodiment of the invention. The air nozzles or air directing means are preferably supported independently of the stack. In the disclosure hereafter the volume control means advantageously includes valve means responsive to the pressure detecting means. The air supplying means may include a motor driven fan means, the volume of which may alternatively be made dependent upon a control for varying the speed of the motor driving the fan.

Other objects, advantages and features of this invention will become apparent when the following description is taken in conjunction with the accompanying drawings, in which:

FIGURE 1 is a diagrammatic and schematic illustration of a control system embodying the teachings of this invention; and FIGURE 2 is an enlarged drawing of a portion of the stack arrangement illustrating the particular relation of the components in a preferred embodiment.

Referring to FIGURE 1 there is illustrated a direct-melt glass furnace indicated generally at 10 having a molten pool of glass 11 within the interior of the furnace, the temperature of which is controlled by a plurality of burners 12. Forehearths and associated feeders are indicated generally at 13. A conduit 14 is shown communicating with the interior of the furnace and formed within a structure adapted to support an exhaust system indicated generally at 20. The combustion products exhaust system 20 advantageously comprises a stack 22 having associated therewith a recuperator means 21. The recuperator means 21 provides a heat exchange between the flue or stack means 22 and raw or incoming air which is to be combined with the fuel fed to the burners 12. As is well known, the combination of heated air and the fuel improves the operation and efficiency of the furnace 10.

An air supply or blower means 40 is connected via a conduit 41 and a circumferentially extending conduit 42 surrounding the upper portion of stack or flue 22 to provide air to nozzle means 43 connnected to conduit 42 via conduit 44. The nozzles 43 direct air substantially vertically downwardly against the rising stream of combustion products and dampen or slow the exhausting of such products to control the pressure within the furnace.

A probe 31 senses or detects the pressure within the furnace 10. Although the probe 31 is shown in this embodiment as located at the upper surface of the interior of the furnace 10, it may be disposed as desired or convenient within the furnace 10 and then calibrated so that the difference between the level of the pool of glass within the furnace and the height of the probe from the glass level is added to the pressure detected by the probe 31 to provide an accurate measurement of the pressure at the glass level.

Measurements from the probe 31 are received by the controller 30. An ambient air pressure detecting means 32 is mounted at the same critical elevation as the air pressure detecting probe 31 within the furnace, to provide a compensating means for exterior ambient or atmospheric pressures outside of the furnace. The controller, in accordance with practices already well known in the art, receives the pressure measurement from the probe 31, compares the measurement with preset values, and provides a signal indicating the amount of change required by a dampering means to return the pressure within the furnace to a desired point. Since controllers of the type required are commercially available, details will not be supplied herein. However, a commercially available furnace pressure transmitter such as the Hayes Model 252 and an electronic controller such as the Hayes Series 855 are suitable for use in this embodiment.

A signal may be transmitted via a connection 34 to a variable valve means 50 located in conduit 41 to control the flow of air from blower 40 to the air nozzles 43. Alternatively, a signal may be provided via lead 33 to a motor of the blower means 40 to vary the speed of the motor and thus vary the amount of air supplied. The valve means 50 is preferable to a variable speed motor since valve means 50 of the nature desired is less expensive than a variable speed motor. A control valve suitable for use herein is commercially available from Mason-Neilan, Series 31,000. An electropneumatic positioner for use with the valve is also available from Mason-Neilan, Model 8011.

Referring to FIGURE 2 there is illustrated in greater detail the relationship between the nozzle means 43 and the flue or stack 22. The nozzle means 43 must be located upwardly from the stack means 22 since when the stack is in operation it will expand to a position indicated in dotted lines at 22a in response to the heat of the combustion materials being exhausted through the stack. The nozzle 43 may be a five inch diameter, sixteen gauge conduit connected to a similarly sized conduit 44. In order to provide sufficient pressure for at least two of the nozzles 43, a six inch diameter conduit 42 is utilized extending circumferentially around the stack 22 to supply two or more of the nozzles as required. It is to be noted that a frame means 60 is utilized to support the nozzles and air supply conduits independent of the stack 22 to avoid problems connected with the expansion and contraction of the stack 22 as the furnace is fired and shut down. The nozzle 43 is advantageously connected to upstanding conduit 44 by plate and bolt means indicated generally at 46 so that various size and/or replacement nozzles may be interchanged in the system without disturbing the remainder of the system. A blast gate is indicated at 47 in the upstanding conduit 44 to provide a further control. In the embodiments shown herein, two dampering air nozzles are utilized, equally spaced at 180° around the metal stack to provide the control required. The dampering air fan or blower means may be any industrial type fan having preferably a 1500 cubic feet per minute capacity pressure to overcome system losses within the dampering control system.

There has thus been described a pressure control system for a direct-melt furnace which experiments have indicated is capable of controlling the pressure at the glass level within the furnace within .01 inch of a water column. A pressure control means such as the one indicated increases the life of a furnace and has sufficient range to be useful throughout the life of the furnace as the throughput of the furnace is increased by manufacturing techniques, and as the fire power of the furnace increases from the usual fifty percent setting at the beginning as the refractory within the furnace gets thinner and the system is otherwise modified for various operations.

It is to be noted that the controller 30 herein is shown only as utilized with the detection of the pressure within the furnace. However, it should be recognized that the glass level itself, without regard to the control of the pressure by the system shown, varies according to the feeding of raw materials to the furnace for melting, as controlled by a glass level control means. Therefore, the most refined modification of such a system would include a detection of the glass level in connection with the pressure control means to modify the dampering supplied by the control system to a new or different operation as required with a different glass level as set up by the operator or by the glass level control means.

In conclusion, it is to be noted that the embodiments described and disclosed herein are meant to be illustrative only and not limiting in any sense. The embodiments described serve merely to illustrate the spirit and scope of the invention.

What I claim is:

1. Apparatus for minimizing combustion and level variations in the melting zone of a furnace connected to a forehearth-feeder supplying glass for attenuation into fibers and thus controlling the diameter of the fibers attenuated comprising a furnace having a melting tank for converting glass batch into a pool of molten glass, a forehearth-feeder connected to said melting tank to receive the pool of molten glass, the level of the pool in said forehearth-feeder being directly dependent upon the level of the pool in said melting tank, combustion means in said tank for heating said melting tank, a combustion products exhaust system including a stack connected to said melting tank to draw combustion products from the melting tank, means for detecting pressure in said melting tank within said furnace, means for directing an air curtain substantially vertically downwardly into said stack, means for supplying air to said directing means, and means responsive to said pressure detecting means for controlling the volume of air supplied to said directing means to stabilize pressure conditions within the melting tank whereby the lever of said pool is relatively unaffected by atmospheric conditions in said melting tank.

2. Apparatus according to claim 1 in which said air directing means comprises a plurality of air nozzles.

3. Apparatus according to claim 1 which further includes means for supporting said air directing means and said air supply means independently of said stack.

4. Apparatus according to claim 1 in which said volume controlling means includes valve mean responsive to said pressure detecting means.

5. Apparatus according to claim 1 in which said air supplying means comprises a motor-driven blower means.

6. Apparatus according to claim 5 in which said volume controlling means includes means for varying the speed of said motor.

7. Apparatus according to claim 2 in which said air supplying means includes a conduit extending circumferentially around said stack to provide air under pressure to said plurality of air nozzles connected thereto.

8. A method for minimizing combustion and level variations in the melting zone of a furnace connected to a forehearth-feeder supplying glass for attenuation into fibers and thus controlling the diameter of the fibers attenuated comprising the steps of connecting a pool of molten glass in a melting tank of a furnace to supply molten glass to a forehearth-feeder and to control the level of glass in said forehearth-feeder, detecting the pressure in the melting tank within the furnace, directing an air curtain downwardly into a stack connected to draw combustion products from the melting tank, and regulating the volume of said air in said curtain in response to the detection of predetermined pressures within the furnace to stabilize pressure conditions within the melting tank whereby the level of said pool is relatively unaffected by atmospheric conditions in said melting tank.

References Cited

UNITED STATES PATENTS

| | | | |
|---|---|---|---|
| 1,918,512 | 7/1933 | Albright et al. | 236—14 |
| 2,744,687 | 5/1956 | Dailey | 236—15 |
| 2,979,322 | 4/1961 | Dailey | 236—15 X |
| 3,106,175 | 10/1963 | Anderson | 110—160 |
| 3,215,501 | 11/1965 | Phillips | 110—160 X |

EDWARD J. MICHAEL, *Primary Examiner.*